US012633713B2

(12) United States Patent
Ahmed et al.

(10) Patent No.: US 12,633,713 B2
(45) Date of Patent: May 19, 2026

(54) DEVICE AND METHOD FOR AMPLIFYING A LASER PULSE

(71) Applicant: Universität Stuttgart, Stuttgart (DE)

(72) Inventors: Marwan Abdou Ahmed, Stuttgart (DE); Florian Bienert, Stuttgart (DE)

(73) Assignee: Universitat Stuttgart (DE)

( * ) Notice: Subject to any disclaimer, the term of this patent is extended or adjusted under 35 U.S.C. 154(b) by 598 days.

(21) Appl. No.: 18/159,137

(22) Filed: Jan. 25, 2023

(65) Prior Publication Data

US 2023/0238761 A1    Jul. 27, 2023

(30) Foreign Application Priority Data

Jan. 27, 2022    (EP) .................................... 22153730

(51) Int. Cl.
| | |
|---|---|
| *H01S 3/00* | (2006.01) |
| *G02B 27/28* | (2006.01) |
| *H01S 3/10* | (2006.01) |

(52) U.S. Cl.
CPC .......... *H01S 3/0057* (2013.01); *G02B 27/283* (2013.01); *H01S 3/005* (2013.01); *H01S 3/10038* (2013.01); *G02B 2207/117* (2013.01)

(58) Field of Classification Search
CPC ..... H01S 5/005; H01S 5/0057; G02B 27/238; G02B 27/283
See application file for complete search history.

(56) References Cited

U.S. PATENT DOCUMENTS

| | | | | |
|---|---|---|---|---|
| 9,627,842 | B2 * | 4/2017 | von der Weid .... | H04B 10/2914 |
| 2009/0273828 | A1 * | 11/2009 | Waarts .................. | H01S 3/2383 |
| | | | | 359/341.1 |
| 2010/0142034 | A1 * | 6/2010 | Wise ...................... | H01S 3/2333 |
| | | | | 359/349 |
| 2012/0230353 | A1 * | 9/2012 | Xu ...................... | H01S 3/10061 |
| | | | | 372/18 |
| 2014/0153084 | A1 * | 6/2014 | Papadopoulos ......... | H01S 3/005 |
| | | | | 359/341.1 |

FOREIGN PATENT DOCUMENTS

WO    WO2021071836    4/2021

OTHER PUBLICATIONS

Qiang Hao, Yunfeng Wang, Tingting Liu, Hong Hu, Heping Zeng; IEEE Photonics Journal; Divided-Pulse Nonlinear Amplification at 1.5 um, vol. 8, No. 5, Oct. 2016; 9 pages; IEEE Photonics Society Publication, USA.

(Continued)

*Primary Examiner* — Michael Carter
(74) *Attorney, Agent, or Firm* — Anthony J. Bourget

(57) ABSTRACT

The invention relates to a device (10) for amplifying a laser pulse which comprises a divider section (14) for dividing the laser pulse into multiple sub pulses (43) and for introducing a time delay between the sub pulses (43), a compressor section (15) for compressing the temporally divided sub pulses (43) and a combiner section (17) for combining the compressed sub pulses (44) to one compressed laser pulse (45).

19 Claims, 4 Drawing Sheets

(56)             References Cited

OTHER PUBLICATIONS

Florent Guichard, Yoann Zaouter, Marc Hanna, Khanh-Linh Mai, Franck Morin, Clemens Honninger, Erick Mottay, Patrick Georges; High-Energy Chirped-and Divided-Pulse Sagnac Femtosecond Fiber Amplifier, Jan. 1, 2015, vol. 40 No. 1, 4 pages, Optical Society of America, USA.
Shian Zhou, Frank W. Wise, Dimitre G. Ouzounov; Divided-Pulse Amplification of Ultrashort Pulses; Apr. 1, 2007, vol. 32, No. 7, 3 pages, Optical Society of America; United States.
European Patent Office; Search Report; Application No. EP 22153730, 10 pages, Jul. 28, 2022; Germany.

* cited by examiner

DEVICE AND METHOD FOR AMPLIFYING A LASER PULSE

BACKGROUND OF INVENTION

The present invention relates to a device and a method for amplifying laser pulses according to the independent claims.

PRIOR ART

The scaling of high-energy and high peak-power chirped pulse amplification-based laser systems is often limited by the grating compressors used at the end. These grating compressors can suffer from the high-energy and peak-power densities resulting from the amplified pulses and this is a great disadvantage.

SUMMARY OF THE PRESENT INVENTION

The objective of the present invention is to present a device as well as a method for amplifying a laser pulse which drastically minimizes the risk of damaging the compressor. Thus, the objective is further to increase the lifetime of the compressor.

The above objective is solved by a device for amplifying a laser pulse which comprises a divider section for dividing a laser pulse into multiple sub pulses and for introducing a time delay between the sub pulses. In other words, temporally divided sub pulses are generated. Preferably, there is no spectral division of the pulses. In particular, each sub pulse has the same spectral composition as the pulse from which it originates.

Furthermore, the device comprises a compressor section for compressing the temporally divided sub pulses and a combiner section for combining the compressed sub pulses to one compressed laser pulse. In other words, the device is configured to generate sub pulses with a time delay which then pass the compressor section one after another and thus not at the same time and to combine them subsequently.

The device is especially a high-power and high-energy laser amplifier. The device may further comprise a pulse source, such as e.g., a laser for creating a laser pulse and/or a stretching unit for stretching the laser pulse and/or an amplification unit for amplifying the stretched laser pulse before it enters the divider section. The stretching unit can for example comprise a dispersive fiber which result in a temporal broadening of the pulse. In other words, a pulse is stretched by means of its spectral bandwidth. The amplification unit then increases the energy of the stretched laser pulse. Alternatively, also optical gratings and/or prisms can be used for the temporal broadening.

Especially, the device has only one compressor section. Furthermore, the compressor section advantageously comprises only one compressor through which each sub pulse passes. The invention does not use spatially divided pulse compression resulting in the use of different compressors in parallel with a challenge to combine the compressed beams and the need for active stabilization to adjust the path lengths since in practice every compressor is different. In contrast, the present invention uses temporally divided pulse compression. The sub pulses have only a fraction of the energy of the amplified laser pulse which substantially decreases the energy load on a grating in the compressor section which in turn increases its lifetime.

The divider section and the combiner section can be integrated into the compressor section. In other words, the function of the divider section and the combiner section is fulfilled by the compressor section. So, only the compressor section serves to divide an amplified laser pulse into at least two sub pulses, introducing a time delay between these, compressing the sub pulses and combining them again. For this purpose, there can be a polarizing beam splitter dividing a laser pulse into sub pulses, one having a first polarization and another having a second polarization (preferably orthogonal to the first one). Each of these two sub pulses preferably contains then half of the energy of the pulse entering the compressor section.

A polarizing beam splitter can be configured as a thin film polarizer, letting pass the p-polarized part of the pulse and reflecting the s-polarized part of a pulse and thus creating two differently polarized sub pulses. The p-polarization is referred to the first polarization and the s-polarization to the second polarization in the following.

Furthermore, a polarizing beam splitter can be configured as a birefringent crystal such that splitting is based on a crystal with high birefringence. The underlying principle is that, since the index of refraction depends on the polarization, an unpolarized pulse which enters a uniaxial birefringent material it is split into two beams propagating in different directions and having different, preferably orthogonal polarizations.

Advantageously, the divider section and the combiner section are separate from the compressor section and allow a division into more than two sub pulses. Especially the divider section has multiple divider stages each dividing an incoming pulse into two pulses having preferably half its energy.

The combiner section can also have multiple combiner stages. If a sub pulse is divided again into two sub pulses, the present application still uses the term sub pulse. In particular, the divider section and the combiner section have the same number of stages utilized for division and combination, such that the sub pulses created in the divider section passing the combiner section after having been compressed are combined into one combined compressed pulse.

The divider section and the combiner section can be combined in a divider/combiner section wherein the divider/combiner section is configured to divide a laser pulse into multiple sub pulses while introducing a time delay between these if the laser pulse travels through the divider/combiner section in one direction.

The divider/combiner section is at the same time configured to combine the compressed sub pulses to one compressed laser pulse if the sub pulses travel through the divider/combiner section in the opposite direction. In other words, the divider section and the combiner section are identical while only the direction in which a pulse to be divided or sub pulses to be combined pass through the divider/combiner section decides whether a division or a combination takes place.

The divider section and the combiner section and/or the combined divider/combiner section comprise at least one divider stage or preferably more than one, especially more than two or three, divider stages.

Each divider stage can comprise two polarizing beam splitters as well as two differently long beam paths. Furthermore, each divider stage and/or combiner stage preferably comprises one or two or more than two mirrors. In a divider stage, the pulses are split up, then guided on two paths with different lengths and then brought on the same path again. In addition, each divider stage can have a quarter wave plate and/or a half wave plate positioned before the first beam splitter and/or a half wave plate positioned after the second beam splitter. The same applies to each combiner section.

The half wave plate serves to rotate the polarization of each incoming pulse into a polarization state which leads to two emerging sub pulses containing the same energy. In addition, or alternatively to the half wave plates of the sections, before the first divider stage and/or compressor stage a quarter wave plate can be placed. The quarter wave plate can be used to convert the linearly polarized incident sub-pulse into circularly polarized sub-pulse, also leading to two emerging sub pulses containing the same energy.

When hitting the first beam splitter in a divider section, each pulse is split into two sub pulses. A sub pulse having a first polarization passes both beam splitters. It thus travels a first path. A sub pulse having a second polarization will be reflected by both beam splitters as well as both mirrors travelling a second path. Due to the vertical dimension of the second path, namely the distance between the beam splitters and the neighboring mirrors in the second path, the sub pulse with the second polarization exits the divider stage following the same path but with a temporal delay as compared to the one with the first polarization. As explained above, a half wave plate can be disposed behind the second beam splitter to rotate the polarization of both sub pulses. The sub pulses exit the respective divider stage with the polarization states 0° and +90°. The half wave plate rotates them to the states +45° and −45°. The first beam splitter of the following divider stage creates again pairs of each of them with polarizations of 0° and 90°. The same can apply to a combiner section.

Preferably, the vertical dimension of each divider stage differs such that created sub pulses do not overlap.

A combiner stage can be configured identical to a divider stage, forming a divider/combiner stage which acts as a divider stage in one direction and as a combiner stage in an opposite direction. A divider/combiner section can comprise multiple divider/combiner stages. When passing a combiner section, the same principle as discussed above is reversed. The compressed sub pulses having exactly the same time delay introduced by the divider section will then be recombined. Each divider stage can serve as combiner stage with opposite propagation direction.

Advantageously, the compressor section comprises a compressor and a Sagnac interferometer with a polarizing beam splitter. The compressor is disposed in the Sagnac interferometer such that each sub pulse created by the polarizing beam splitter passes the compressor once. Especially, the compressor section has three mirrors such that a sub pulse having a first polarization and a sub pulse having a second polarization travel through the compressor section and thus also through the compressor in opposite directions. However, both travel the same path length through the Sagnac interferometer such that they meet at the polarizing beam splitter at the same time and are recombined to a compressed sub pulse having a circular polarization.

The compressor can be understood as an optical unit used for pulse compression, e.g. either in Treacy (with 1, 2, 3 or 4 gratings) or Martinez configuration or by using dispersive mirrors or prisms. Thus, the compressor preferably comprises gratings, in particular it can be configured as a two gratings Treacy compressor. Further, the compressor can comprise at least one dispersive mirror or at least one dispersive prism.

In particular, the compressor section can have a polarization rotator device which can e.g. be a half wave plate or a Faraday rotator, and which is also placed in the Sagnac interferometer such that one sub pulse passes it before passing the compressor. This ensures that the compressor which can be polarization sensitive sees the same polarization. Furthermore, it ensures that the pulse travels exactly the same way backwards and thus experience the same beam path.

The compressor section can be understood as the compressor plus the Sagnac interferometer, while further mirrors, the polarization rotator device and the beam splitter can be included.

If the compressor is insensitive to polarization—since it is for example based on polarization insensitive gratings or on chirped mirrors which are known to be polarization insensitive—the polarization rotator device inside the Sagnac interferometer can be omitted. In other words, sub pulses divided at the beam splitter in the compressor section return to the beam splitter after being reflected on the three mirrors and passing through the compressor and optionally the polarization rotator device. The compressor section can have another polarization rotator device as well as a quarter wave plate placed before the polarizing beam splitter.

With the compressor section as described above the compressed sub pulses can be collinear with the incident laser sub pulses entering the compressor section but propagating in opposite directions.

In another embodiment, the compressor section can comprise a compressor having two gratings as well as a functional unit, such as e.g., a retro-reflecting mirror-pair (RPM), a polarization beam splitter, a mirror and a polarization rotator device, wherein the mirror and the polarizing beam splitter are placed in front of the compressor and the compressor is placed such that both sub pulses emerging from the polarizing beam splitter pass each grating twice. Further, a one grating compressor can be used comprising only one grating which is then passed four times. Generally, a compressor having a number of gratings of at least one can be used wherein each pulse experiences four passes over a grating.

Furthermore, the polarization rotator device can be placed such that the sub pulses emerging from the polarizing beam splitter pass the polarization rotator device once. This configuration allows a separation between the incident sub pulses and the compressed sub pulses, while at the same time also enabling a collinear outcoupling when desired. An RPM can be understood as two mirrors which are positioned with an angle of 90° between them which has the advantage that every beam reflected by the two mirrors is parallel to the incident beam (at least in one plane).

In detail, the configuration can be such that the beam splitter creates two sub pulses with different, preferably orthogonal, polarizations. The sub pulse with the first polarization is reflected by the beam splitter and the mirror and then passes through the polarization rotator device which changes its polarization to the second polarization. It then enters the compressor on a first path and exits the compressor on a second path. The sub pulse now approaches the polarization beam splitter from the other side. The change of side and polarization enables the sub pulse to now be transmitted through the beam splitter thus exiting the compressor section on the second beam path.

A sub pulse with the second polarization passes through the polarizing beam splitter and enters the compressor on a third beam path. It exits the compressor on a fourth beam path and is subsequently guided first through the polarization rotator device where its polarization is rotated, then over the mirror and then toward the polarization beam splitter. The change of side and polarization enables the sub pulse to now be reflected at the polarization beam splitter. Due to the geometrical arrangement the sub pulse also exits the compressor section on the above mentioned second path, thus it recombines with the other sub pulse at the polarizing beam splitter. This means, that both sub pulses thus travel the compressor section in different directions but exit the polarizing beam splitter at the same time and position. The compressed pulse exits at a different position than the incoming sub pulse which can be adapted by the position of the mirror. If wished, the mirror can be placed such that a collinear outcoupling is achieved, meaning that the first and the fourth beam paths as well as the second and the third beam paths are identical.

The compressor section in any configuration as explained above can be configured to split each sub pulse again into two sub pulses having the same energy before passing the compressor. Thus, the energy of the two sub pulses is half of the energy of the undivided pulse. This means when having N divider stages a number of $2^N$ sub pulses is created at the end of the divider section and/or divider/combiner section. In combination with the compressor section the energy can be reduced by a factor of $\frac{1}{2}^{N+1}$ with N being the number of divider stages.

In another aspect the invention relates to a method for amplifying laser pulse, wherein the method comprises stretching the laser pulse and amplifying the stretched laser pulse. The method further comprises dividing the laser pulse into multiple sub pulses, introducing a time delay between the sub pulses, compressing the sub pulses and combining the compressed sub pulses to one compressed laser pulse. In particular, the method is conducted by a device as described above.

The present invention allows for a separation of time between sub pulses. Since the pulses are not separated in space, but in time, for the compression, only one compressor and only one beam path is required. This drastically reduces the costs and the required space for a respective device. The separation in time ensures that all sub pulses travel the same way enabling the use of passive pulse combination. In other words, a passive setup without any requirement for active stabilization can be used. In contrast, spatially divided pulse compression requires active stabilization to adjust the path lengths experienced by the sub pulses in the multiple compressors.

Most importantly, the load of a high peak power is shifted from the compressor section to the divider and combiner section and/or the divider/combiner section comprising polarizing beam splitters which in addition to being cheaper, can withstand much higher intensities and fluences compared to a compressor which typically uses gratings. Thus, the invention allows amplifying laser pulses, especially high peak power laser pulses, in an efficient and cost-effective way.

DETAILED DESCRIPTION OF THE INVENTION

Figure 1:
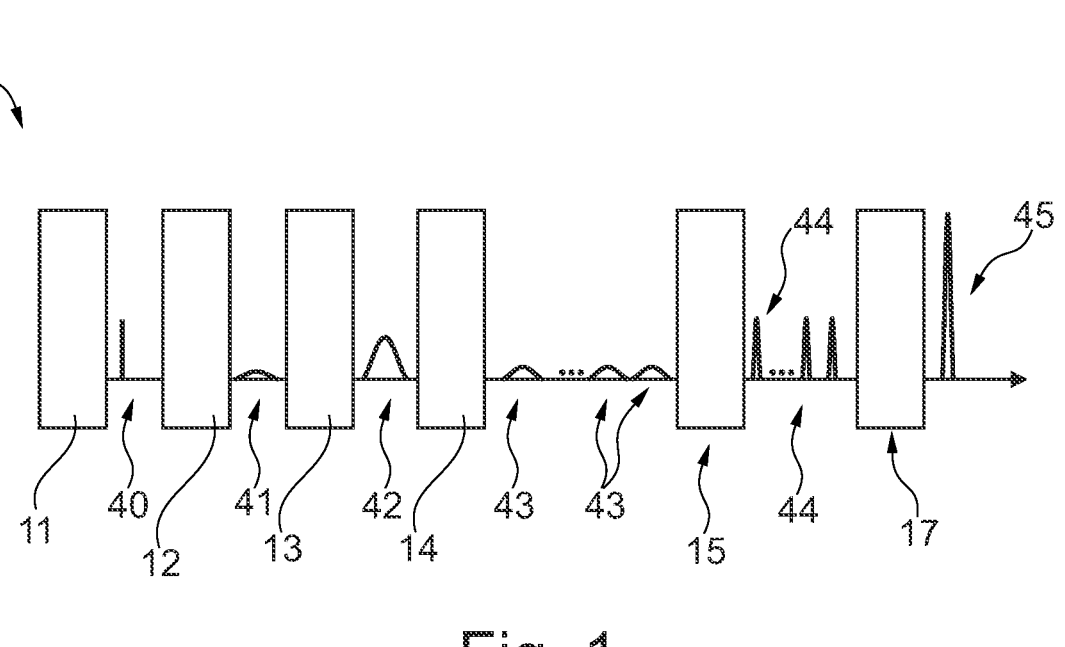
FIG. 1: a device according to the invention.

FIG. 1 shows a device 10 according to the invention which may comprise a stretching section 12 for stretching a laser pulse 40. The device 10 may further comprise a pulsed source 11 such as for example a laser for generating the pulse 40.

Furthermore, the device 10 may comprise an amplification unit 13 for amplifying the stretched pulse 41 exiting the stretching unit 12. As a result, an amplified pulse 42 exits the amplification unit 13 and enters a divider section 14 of the device 10. The divider section 14 of the device 10 divides the amplified pulse 42 into multiple sub pulses 43 which only have a fraction of the original energy of the amplified pulse 42.

The sub pulses 43 enter the compressor section 15 of the device one after another which compresses each of them in succession accordingly. Compressed sub pulses 44 exit the compressor section 15 and enter the combiner section 17 in which the compressed sub pulses 44 are combined into one compressed combined pulse 45. In the device 10 shown in FIG. 1 the divider section 14 and the combiner section 17 are separate from each other.

Figure 2:
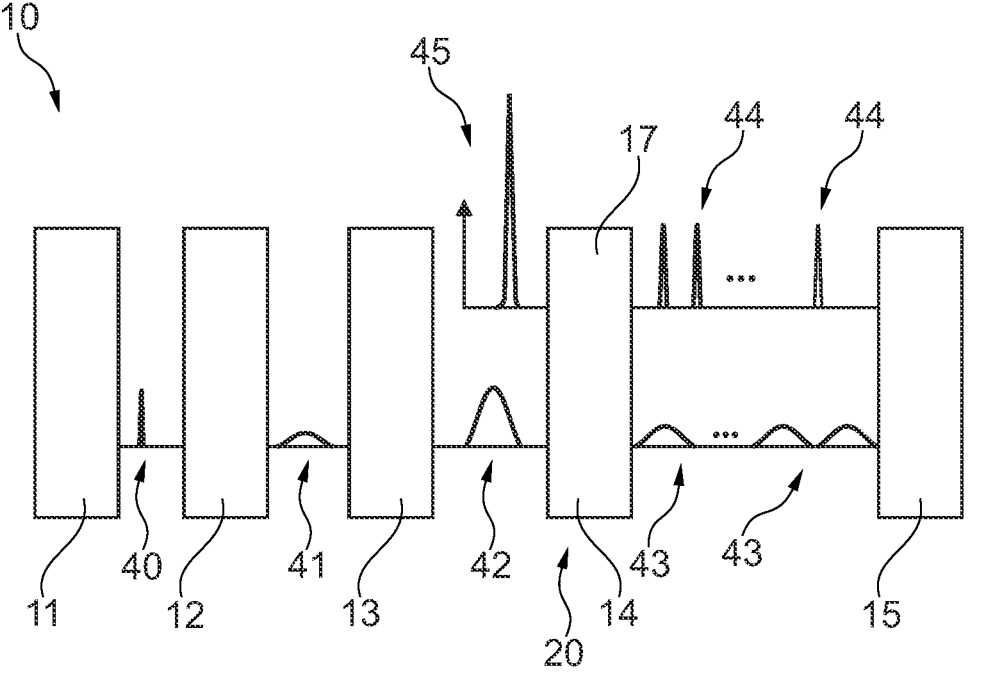
FIG. 2: another device according to the invention.

FIG. 2 shows another device 10 according to the invention which is analogue to FIG. 1 except for the following differences:

The divider section 14 and the combiner section 17 are combined in a divider/combiner section 20. As it can be seen in FIG. 2, the amplified pulse 42 enters the divider/combiner section 20 in one direction wherein sub pulses 43 exit and enter the compressor section 15. Compressed sub pulses 44 pass through the divider/combiner section 20 in the opposite direction and are combined into one compressed combined pulse 45.

Figure 3:
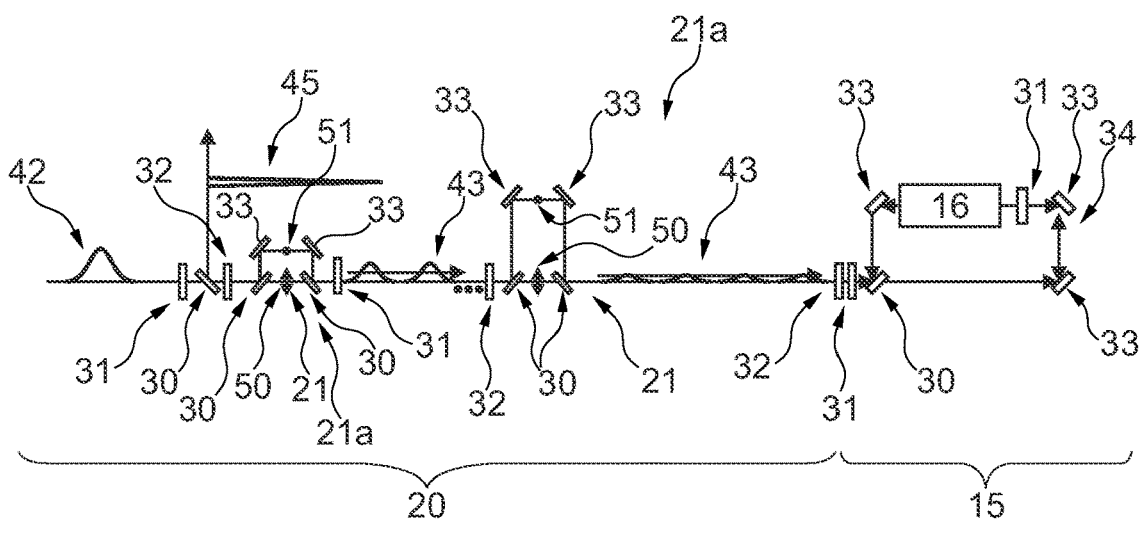
FIG. 3: the divider/combiner section as well as the compressor section of FIG. 2 in more detail.

FIG. 3 shows the divider/combiner section 20 as well as the compressor section 15 of FIG. 2 in more detail. Starting with the divider/combiner section 20 two divider stages 21 are shown. The configuration can have more divider stages 21 as indicated by the three dots.

Before entering the first divider stage 21 a half wave plate 31 is placed in front of a polarizing beam splitter 30. This first polarizing beam splitter 30 serves to couple out the compressed combined pulse 45 which results when the sub pulses travel in the opposite direction after having been compressed.

Behind the polarizing beam splitter 30 and in front of the first divider stage 21 a quarter wave plate 32 is placed. Typically, the stretched and amplified pulse 42 has a linear polarization which is rotated by the half wave plate 31 and then transformed into a circular polarization by means of the quarter wave plate 32.

The first divider stage 21 comprises two polarizing beam splitters 30 as well as two mirrors 33. The pulse 42 is split into a sub pulse having a first polarization 50 and a sub pulse having a second polarization 51 as it can be seen in FIG. 3. The first polarization 50 is shown by a double arrow while the second polarization 51 is shown by a dot. While the sub pulse having the second polarizing 51 travels the upper path including the mirrors 33, the sub pulse having the first polarization 50 travels the lower path. Since the paths are differently long due to the vertical dimension of the upper path, there is a time difference between the sub pulses 43 exiting the first divider stage 21 after passing another half wave plate 31. Both sub pulses only have half the energy of the incident pulse 42.

The two sub pulses 43 then enter the second divider stage 21 shown in FIG. 3. The last divider stage 21 again comprises two polarizing beam splitters 30, two mirrors 33 as well as a quarter wave plate 32 in front of the first beam splitter 30. The quarter wave plate 32 changes the polarization of both sub pulses 43 into a circular polarization such that the sub pulses 43 can be split again in a polarization dependent way by the first beam splitter 30 of the other divider stage 21. Alternative to this last quarter wave plate 32 the half wave plate 31 after each divider stage 21 can guarantee the splitting of the incident pulse. The pulses exit the respective divider stage with the polarization states 0° and +90°. The half wave plate 31 rotates them to the states +45° and −45°. The first beam splitter of the following divider stage creates again pairs of each of them with polarizations of 0° and 90°.

Following the same principle as in the first divider stage 21 four sub pulses 43 are generated from the two sub pulses 43 entering this divider stage 21, again halving the energy of each pulse entering the divider stage 21. The vertical dimension of the upper path in the divider stage 21 is different from the one first divider stage 21 such that pulses do not overlap.

The four sub pulses 43 exiting the last divider stage 21 enter the compressor section 15 which has a quarter wave plate 32 and a half wave plate 31 placed in front of a polarizing beam splitter 30. As a result, the polarization of each sub pulse 43 is transformed such that it will be split in two by the following beam spitter. The compressor section 15 comprises a Sagnac interferometer 34 having a polarizing beam splitter 30 as discussed before and three mirrors 33 while a compressor 16 as well as a half wave plate 31 is placed in the beam path.

The polarizing beam splitter 30 splits each sub pulse 43 once more in a polarization dependent way. One sub pulse having a first polarization 50 propagates in a clockwise direction while the other sub pulse with a second polarization 51 propagates in an anticlockwise direction. They both pass the compressor 16 and reunite at the polarizing beam splitter 30 at the same time since they travel the exact same path. The half wave plate 31 is placed within the loop of the Sagnac interferometer 34 since the compressor 16 in FIG. 3 is polarization selective. It serves to rotate the polarization of one sub pulse before entering the compressor such that the compressor 16 sees the same incident polarization of both sub pulses split by the polarizing beam splitter 30. The beam paths in the Sagnac interferometer are such that the sub pulses divided by the polarizing beam splitter 30 will not cross inside the compressor 16.

The compressed pulses 44 then travel in opposite direction through the divider/combiner section 20. Each divider stage 21 serves as combiner stage 21a in the opposite direction. At each combiner stage 21a compressed sub pulses 44 are recombined such that at the end at the first polarizing beam splitter 30 a compressed combined pulse 45 exits.

Figure 4:
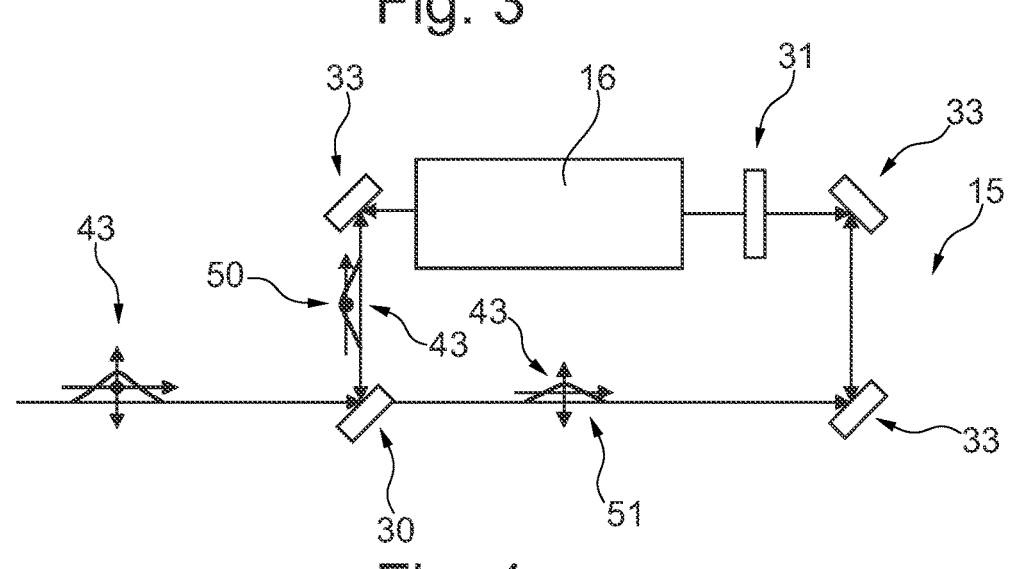
FIGS. 4 and 5: the compressor section of FIG. 3 in more detail.
Figure 5:
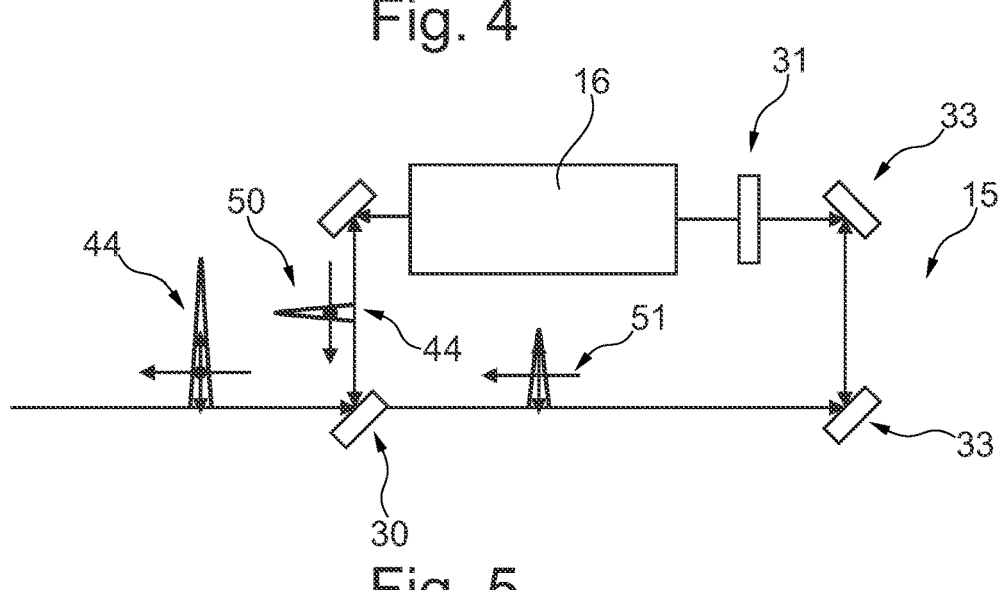

In FIGS. 4 and 5 the compressor section 15 of FIG. 3 is shown in more detail, showing the sub pulses before and after compression, respectively.

It can be seen in FIG. 4 how a sub pulse 43 enters the compressor section 15 wherein the half wave plate 31 and the quarter wave plate 32 are not shown in FIG. 4 for reasons of simplicity. The sub pulse 43 are of linear (but 45°) or circular polarization. The polarizing beam splitter 30 creates two sub pulses with different polarizations, the one with the first polarization 50 propagates in clockwise direction while the second one with a second polarization 51 propagates in anticlockwise direction.

Both sub pulses pass the half wave plate 31 and the compressor 16 in the Sagnac interferometer 34, but at different times. The compressed pulses 44 are recombined at the polarizing beam splitter 30. This can be seen in FIG. 5 showing the sub pulses after having passed the compressor 16.

Figure 6:
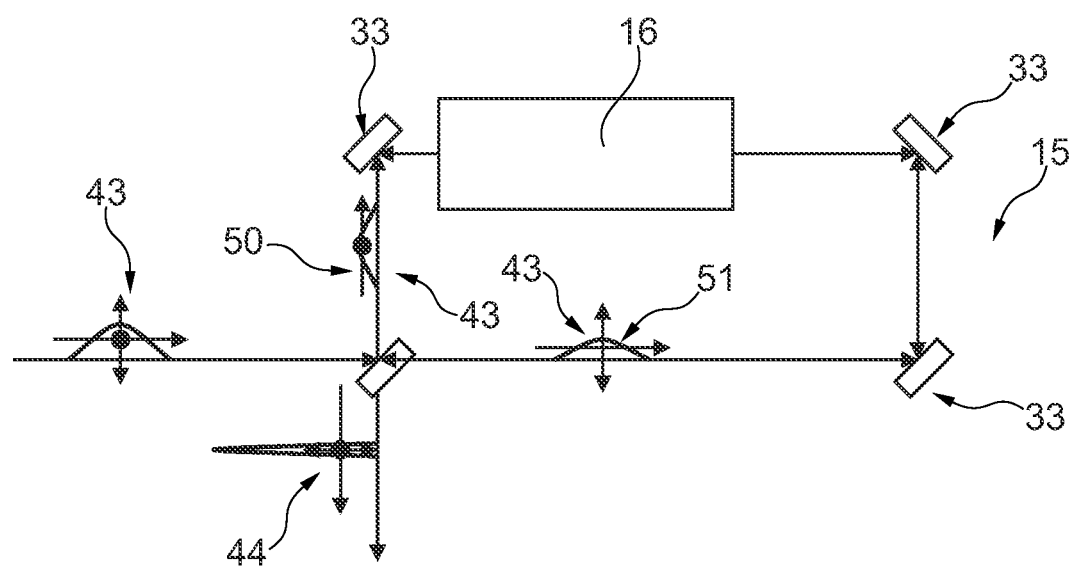
FIG. 6: another compressor section.

In FIG. 6 a different compressor section 15 is shown. It is different from the compressor section 15 shown of FIGS. 3 to 5 for the following reasons:

The compressor section 15 does not have a half wave plate 31 in the Sagnac interferometer 34 since the compressor 16 of FIG. 6 is insensitive to polarization. Therefore, there is no need to include a half wave plate 31 for ensuring that the compressor 16 sees the same polarization. In addition, the compressed pulse 44 exits in a different direction (downwards in FIG. 6), so it is not collinear with the initial sub pulse 43.

Figure 7:
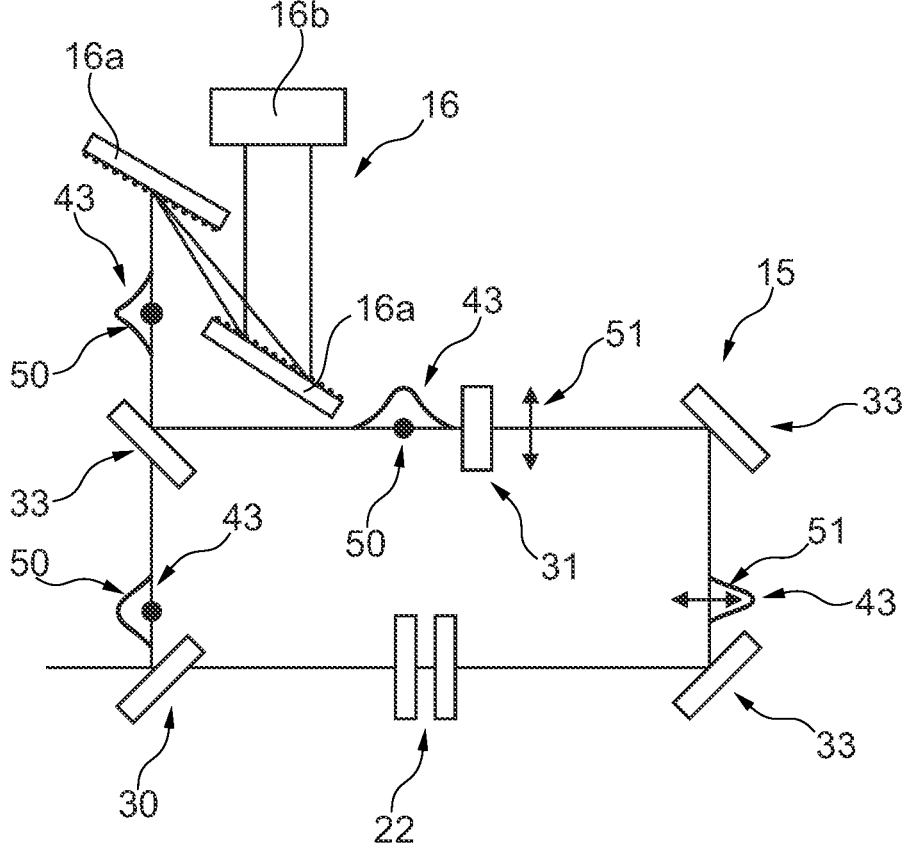
FIG. 7: another compressor section.

FIG. 7 shows a different compressor section 15 which differs from the compressor section 15 of FIGS. 3 to 5 for the following reasons:

A two grating Treacy compressor 16 is integrated into the same configuration shown in FIGS. 3 to 5. The first mirror 33 above the polarizing beam splitter 30 is rotated by 90°. After being split by the beam splitter 30, a sub pulse with a first polarization 50 will enter the compressor 16 at a different height than the sub pulse 43 with the second polarization 51.

In detail, the sub pulse with the first polarization 50 is at a first height which is below the second height on which the mirror 33 is positioned. Thus, it can propagate to the gratings 16a. It then passes through the gratings 16a and the functional unit 16b of the compressor 16. The sub pulse with the first polarization 50 will have the second height and thus have the same height as the mirror 33 after passing the compressor 16 and will thus be reflected to the right in FIG. 7. It then passes the half wave plate 31, the two mirrors 33. When passing the periscope 22 it is set down to the first height again.

The sub pulse with the second polarization passes the beam splitter 30 and is lifted to the second height by the periscope 22. It is then reflected at the mirrors 33 which are at the same height and passes the half wave plate 31. It will also pass the gratings 16a and the functional unit 16b. After passing this unit it is on the first height, thus passing below the mirror 33 and propagating towards the beam splitter 30 as well. At last, the sub pulses will be recombined at the beam splitter 30 and exit the compressor section 15 at the same height than the incident pulse.

Figure 8:
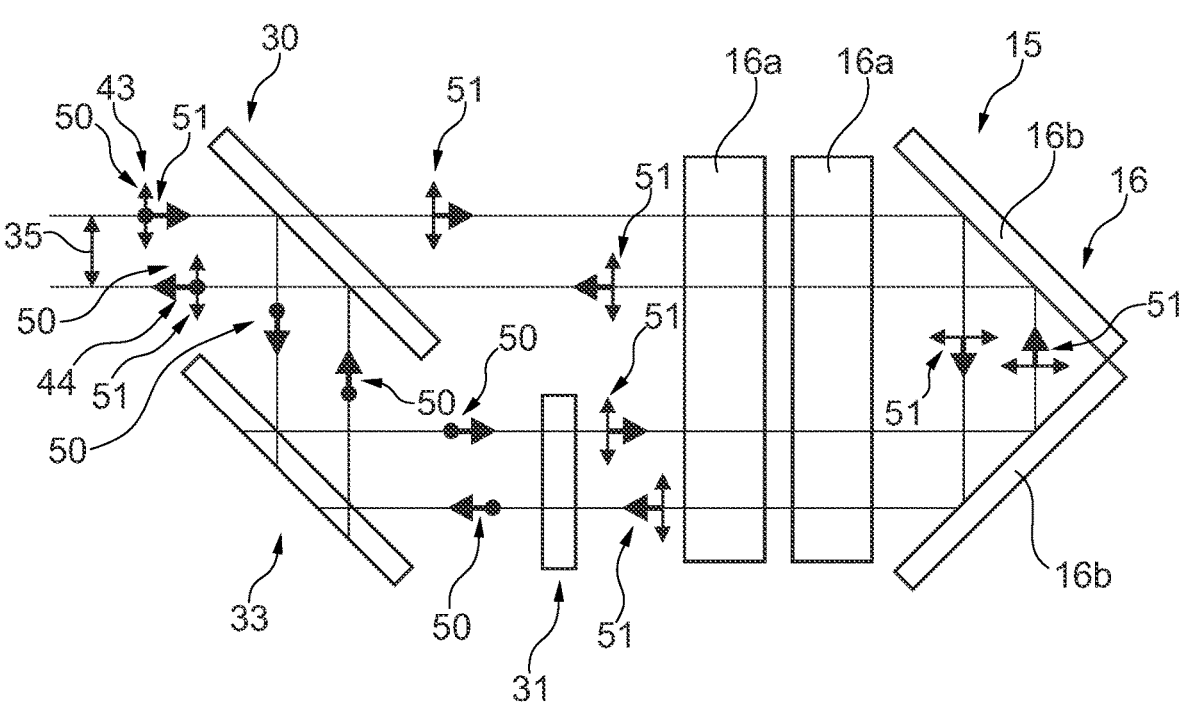
FIG. 8: another compressor section.

FIG. 8 shows an alternative compressor section 15 as compared to the one shown in FIGS. 3 to 7. The compressor section 15 comprises a compressor 16 having a functional unit 16b as well as two gratings 16a. For reasons of simplicity only a single frequency of a multi frequency sub pulse in shown as the gratings are frequency sensitive.

The compressor section 15 has a (not shown here) element in front that ensures that the pulses are polarized such that they are split in half by the beam splitter 30. This can be done via a half wave plate which creates a +/−45° or by a quarter wave plate which creates circular polarization. The compressor section 15 also has a polarizing beam splitter 30 creating sub pulses 43 having a first polarization 50 and sub pulses with a second 51 polarization. In FIG. 8 only the polarization is shown, not the respective sub pulses, for reasons of simplicity.

As it can be seen in FIG. 8, the sub pulse with the first polarization 50 is reflected by the beam splitter 30 and the mirror 33 and then passes through a half wave plate 31 which changes its polarization to the second polarization 51. It then passes through both gratings 16a and enters and exits the functional unit 16b of the compressor 16. Then, it passes the gratings 16a again as well as the polarizing beam splitter 30.

The sub pulse with the second polarization 51 passes through the polarizing beam splitter 30 and both gratings 16a. It enters and exits the functional unit 16b of the compressor 16, passes the gratings 16a again and then the half wave plate 31 which changes it polarization. It is then reflected by the mirror 33 at a different position than the other sub pulse. It recombines with the other sub pulse at the polarizing beam splitter 30, however, at a different height 35 than the incident pulse entering the compressor section 15. Both sub pulses thus travel the compressor section 15 in different directions but exit the polarizing beam splitter 30 at the same time and place. Important is that the compressed pulse 44 exits at a different height 35 than the incoming sub pulse 43.

Figure 9:
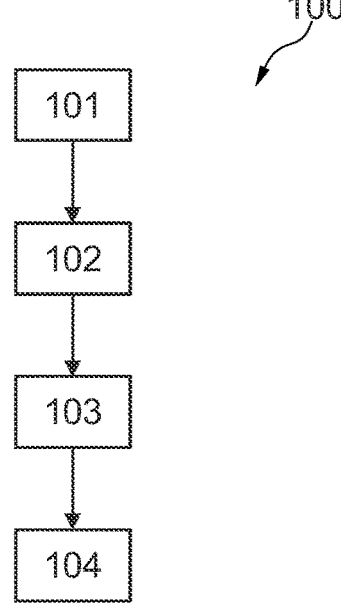
FIG. 9: a flow diagram of a method according to the invention.

FIG. 9 shows a flow diagram of a method 100 according to the invention. The method 100 comprises dividing 101 a laser pulse into multiple sub pulses, introducing 102 a time delay between the sub pulses, compressing 103 the sub pulses and combining 104 the compressed sub pulses to one compressed laser pulse.

REFERENCE SIGNS 10 device
11 pulse source
12 stretching unit
13 amplification unit
14 divider section
15 compressor section
16 compressor
16a grating
16b functional unit
17 combiner section
20 divider/combiner section
21 divider stage
21a combiner stage
30 polarizing beam splitter
31 half wave plate
32 quarter wave plate
33 mirror
34 Sagnac interferometer
35 height
40 laser pulse
41 stretched pulse
42 amplified pulse
43 sub pulse
44 compressed sub pulses
45 compressed combined pulse
50 first polarization
51 second polarization
100 method
101 dividing the laser pulse into multiple sub pulses
102 introducing a time delay between the sub pulses
103 compressing the sub pulses
104 combining the compressed sub pulses to one compressed laser pulse

What is claimed is:

1. A device for amplifying a laser pulse, the device comprising:
a divider section which divides the laser pulse into multiple sub pulses and which introduces a time delay between the sub pulses which become temporally divided sub pulses;
the device further comprising only one compressor section which compresses the temporally divided sub pulses; and
a combiner section which combines the compressed sub pulses to one compressed laser pulse;
wherein the compressor section has only one compressor through which each sub pulse passes,
wherein the divider section comprises at least one divider stage,
each divider stage comprising two polarizing beam splitters and two differently long beam paths,
wherein the beam splitters are configured as thin film polarizers letting pass a p-polarized part of the laser pulse and reflecting an s-polarized part of the laser pulse and thus creating two differently polarized sub pulses,
wherein the combiner section comprises at least one combiner stage,
each combiner stage comprising two polarizing beam splitters and two differently long beam paths,
wherein each divider stage is configured to split laser pulses into sub pulses and to bring the sub pulses on a same path again so that the sub pulses are not separated in space, but only in time, for the compression.

2. The device according to claim 1, wherein the device comprises a stretching unit which stretches the laser pulse and an amplification unit which amplifies the stretched laser pulse.

3. The device according to claim 1 wherein the divider section and the combiner section are integrated into the compressor section.

4. The device according to claim 1 wherein the divider section and the combiner section are separate from the compressor section.

5. The device according to claim 1 wherein the divider section and the combiner section are combined in a divider/combiner section, wherein the divider/combiner section is configured to divide a laser pulse into multiple sub pulses while introducing a time delay if the laser pulse travels through the divider/combiner section in a first direction and to combine compressed sub pulses to one compressed laser pulse if the compressed sub pulses travel through the divider/combiner section in a direction opposite the first direction.

6. The device according to claim 5 wherein the divider/combiner section comprises the at least one divider stage, each divider stage comprising two polarizing beam splitters and two differently long beam paths.

7. The device of claim 6 wherein a divider stage and a combiner stage are identical acting as a divider stage in one direction and acting as a combiner stage in an opposite direction.

8. The device of claim 5 wherein the divider/combiner section comprises the at least one combiner stage, each combiner stage comprising two polarizing beam splitters and two differently long beam paths.

9. The device of claim 8 wherein a divider stage and a combiner stage are identical acting as a divider stage in one direction and acting as a combiner stage in an opposite direction.

10. The device according to claim 1 wherein the divider section and the combiner section are combined in a divider/combiner section and wherein the divider/combiner section comprises at least one divider stage and at least one combiner stage and wherein a divider stage and a combiner stage are identical acting as a divider stage in one direction and acting as a combiner stage in an opposite direction.

11. A device for amplifying a laser pulse, the device comprising:

a divider section which divides the laser pulse into multiple sub pulses and which introduces a time delay between the sub pulses which become temporally divided sub pulses;

the device further comprising a compressor section which compresses the temporally divided sub pulses, the compressor section comprising a compressor and a Sagnac interferometer with a polarizing beam splitter, and wherein the compressor is disposed in the Sagnac interferometer such that each sub pulse following the polarizing beam splitter passes the compressor once; and a combiner section which combines the compressed sub pulses to one compressed laser pulse.

12. The device according to claim 11, wherein the compressor section further comprises a polarization rotator device, the polarization rotator device being placed in the Sagnac interferometer such that each sub pulse following the polarizing beam splitter passes the polarization rotator device once.

13. The device according to claim 11 wherein the compressor section comprises a compressor having two gratings, a polarizing beam splitter, a mirror and a polarization rotator device, and wherein the mirror and the polarizing beam splitter are placed in front of the compressor, and wherein the compressor is placed such that both sub pulses following the polarizing beam splitter pass each grating twice.

14. The device according to claim 13, wherein the polarization rotator device is placed such that the sub pulses following the polarizing beam splitter pass the polarization rotator device once.

15. The device according to claim 11 wherein the compressor is configured as a two-grating Treacy compressor.

16. A method for amplifying a laser pulse, the method comprising:

dividing the laser pulse into multiple sub pulses, including use of thin film polarizers letting pass p-polarized part of the laser pulse and reflecting s-polarized part of the laser pulse and thus creating two differently polarized sub pulses;

introducing a time delay between the differently polarized sub pulses, including combining the sub pulses on a same path so that the sub pulses are not separated in space but only in time;

compressing the sub pulses; and combining the compressed sub pulses to one compressed laser pulse.

17. The method according to claim 16, wherein the method is conducted by a device according to claim 1.

18. The method according to claim 16 wherein the compressing step includes passing each sub pulse through a compressor section having only one compressor and wherein the dividing step includes passing light to a divider section which divides the laser pulse into the multiple sub pulses, the divider section comprising at least one divider stage, each divider stage comprising two polarizing beam splitters and two differently long beam paths, the beam splitters having the thin film polarizers, the combining step includes passing the sub pulses to at least a combiner section comprising at least one combiner stage, each combiner stage comprising two polarizing beam splitters and two differently long beam paths.

19. The method according to claim 18 wherein a divider stage and a combiner stage are identical acting as a divider stage in one direction and acting as a combiner stage in an opposite direction.

* * * * *